United States Patent [19]
Yokomizo

[11] 4,393,407
[45] Jul. 12, 1983

[54] CONTOUR CORRECTING APPARATUS FOR VIDEO SIGNALS

[75] Inventor: Yoshikazu Yokomizo, Kawagoe, Japan

[73] Assignee: Canon Kabushiki Kaisha, Tokyo, Japan

[21] Appl. No.: 203,445

[22] Filed: Nov. 3, 1980

[30] Foreign Application Priority Data

Nov. 7, 1979 [JP] Japan .................................. 54-143972

[51] Int. Cl.³ ............................................... H04N 5/14
[52] U.S. Cl. ................................................... 358/166
[58] Field of Search ...................... 358/160, 166, 21 R, 358/37

[56] References Cited

U.S. PATENT DOCUMENTS

| | | | |
|---|---|---|---|
| 4,030,121 | 6/1977 | Faroudja | 358/166 |
| 4,086,618 | 4/1978 | Koubek | 358/166 |
| 4,170,785 | 10/1979 | Yoshida | 358/166 |
| 4,268,864 | 5/1981 | Green | 358/166 |

*Primary Examiner*—Michael A. Masinick
*Attorney, Agent, or Firm*—Fitzpatrick, Cella, Harper & Scinto

[57] ABSTRACT

A contour correcting arrangement for video signals includes a differentiator to differentiate an input video signal, a delay circuit which delays by a predetermined time period the differentiated waveform resultant from the differentiation and the video signal, and a combining circuit for combining the inverted waveform of the differentiated waveform, delayed differentiated waveform, and delayed video signal.

35 Claims, 8 Drawing Figures

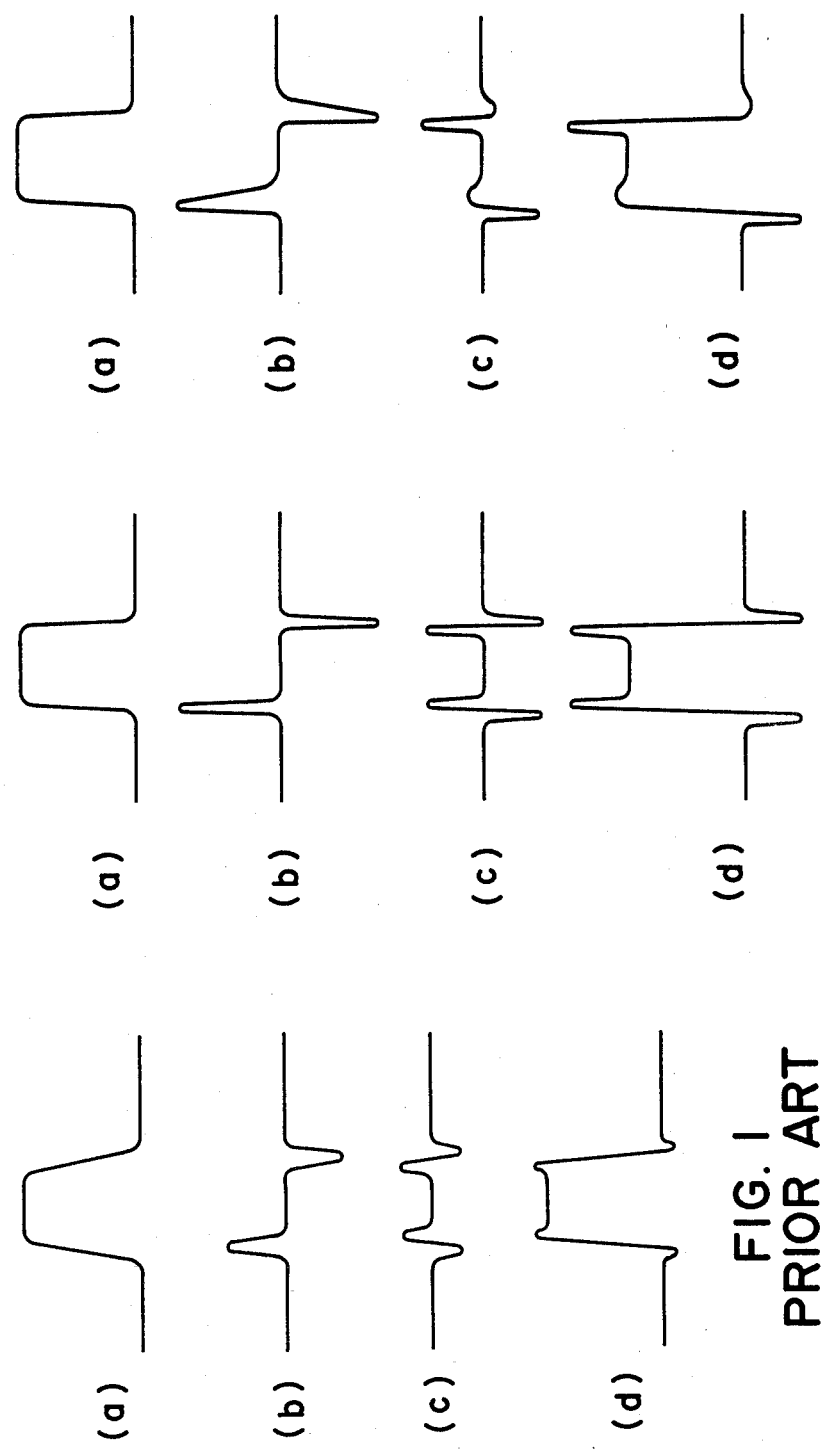

(A) SIGNAL m 
(B) SIGNAL n 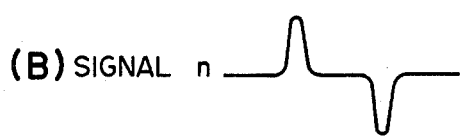
(C) SIGNAL o 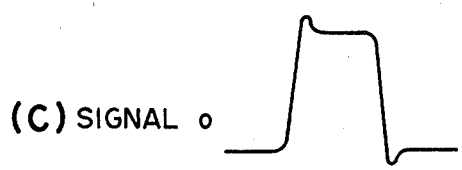
(D) SIGNAL p 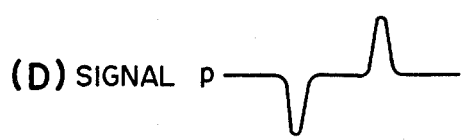
(E) SIGNAL q 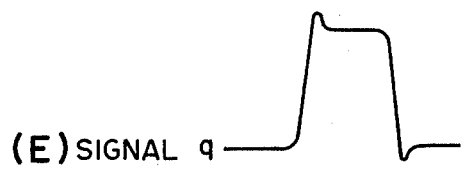
(F) SIGNAL r 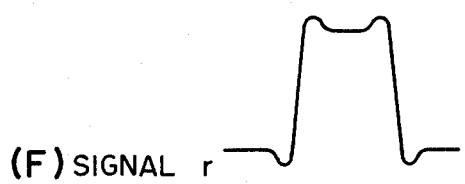
FIG. 5
(A) SIGNAL m 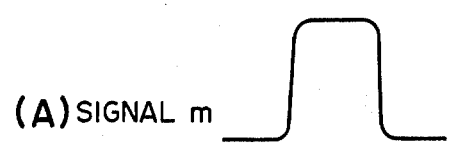
(B) SIGNAL n 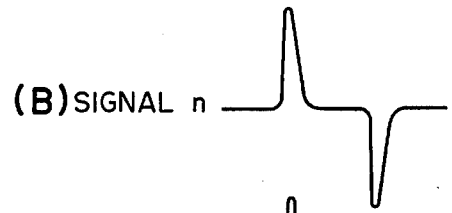
(C) SIGNAL o 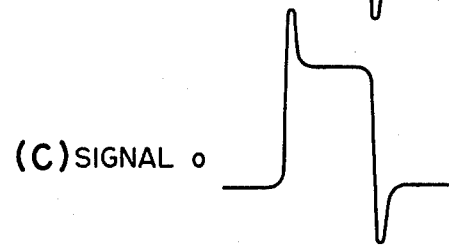
(D) SIGNAL p 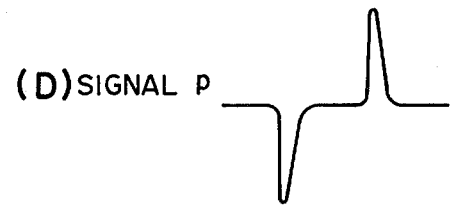
(E) SIGNAL q 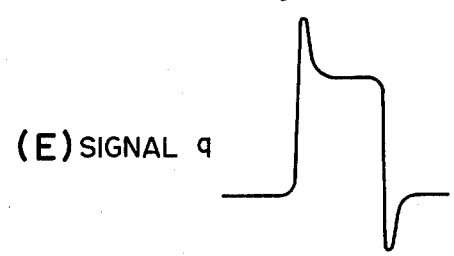
(F) SIGNAL r 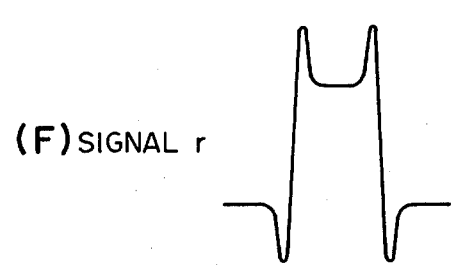
FIG. 6

CONTOUR CORRECTING APPARATUS FOR VIDEO SIGNALS

BACKGROUND OF THE INVENTION

1. Field of the Invention

This invention relates to contour or line correcting apparatus for video signals which emphasize signals corresponding to contours or lines included in the video signals.

2. Description of the Prior Art

Up to the present, various kinds of systems to emphasize the contours of video signals have been presented. Among them, one particularly practical one is the system in which a secondary differentiated waveform of a video signal is inverted in phase and added to the original video signal. Examples of waveforms according to this conventional technique will be described referring to FIG. 1. A primary differentiated waveform (b) is obtained by differentiating the original video signal (a). A secondary differentiated waveform (c) is obtained by further differentiating the wave (b) and then phase inverting it. By adding the signal (c) to the original signal (a), a video signal (d) having a corrected contour or border line is obtained. However, that system has the drawback that, for example, the border line correction may be excessive, since the differential coefficients increase when the leading and trailing edges of the input video signal are steep. Moreover, since the differentiating circuit may generally be composed of a resistor and a capacitor, the differentiation characteristic becomes approximate, differentiation is done imperfectly and, when the leading and trailing edges of the video signal (a) are steep as shown in FIG. 3, the amplitude of the primary differentiated waveform (b) approaches the amplitude of the original signal (a). Since the trailing edge characteristic of the primary differentiated waveform is based on the time constant of the differentiating circuit, there exists a drawback that the border line correction is done asymmetrically.

SUMMARY OF THE INVENTION

An object of this invention is to provide a contour correcting apparatus for video signals from which abovesaid drawbacks of conventional technique are eliminated and which is capable of performing contour correction having a satisfactory symmetrical property.

In other words, an object of this invention is to provide a contour correcting apparatus capable of performing contour correction having a good symmetrical property by obtaining a differentiated signal, which is obtained by primary differentiation of an input video signal, by delaying by a predetermined time both the primary differentiated signal and the input video signal, and by adding the signal obtained by inverting the primary differentiated signal to the delayed signals.

Another object of this invention is to provide a contour correcting apparatus capable of varying the amplitude of a contour correcting signal. Other objects of this invention will become clear through the detailed description that follows.

BRIEF DESCRIPTION OF THE DRAWINGS

FIG. 1 through FIG. 3 show examples of waveform synthesis by conventional methods;

FIGS. 5 and 6 depict signals appearing at the portions of the arrangement shown in FIG. 4;

DESCRIPTION OF THE PREFERRED EMBODIMENTS

Figure 4:
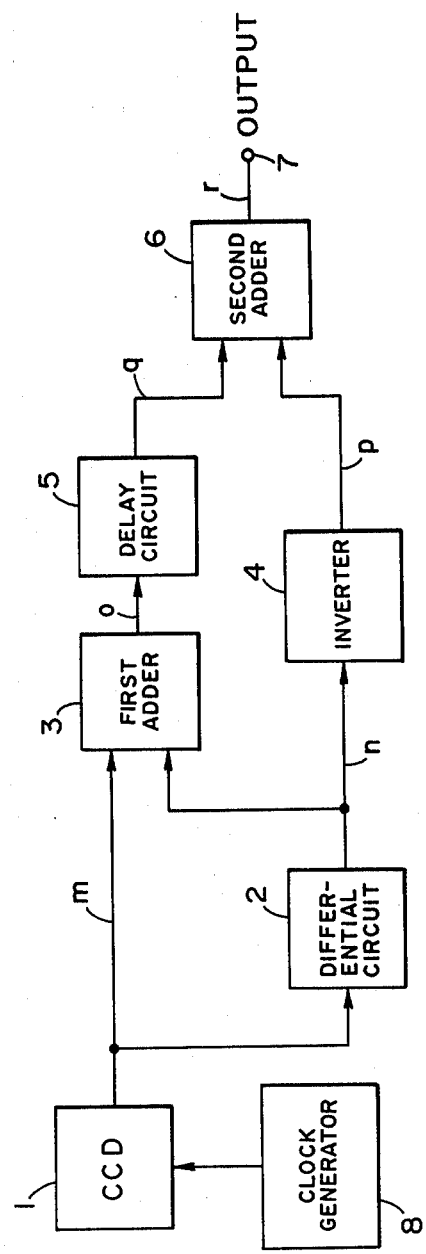
FIG. 4 is a block diagram showing an embodiment of the contour correction apparatus in accordance with the present invention.

This invention will now be described in detail referring to the examples shown in the drawings. FIG. 4 is block diagram of one example, in which reference numeral 1 designates a CCD (charge coupled device) which generates video signals, 2 a differentiating circuit (primary differentiation), 3 a first adder, 4 an inverter, 5 a delay circuit, 6 a second adder, 7 an output terminal, and 8 a clock generator which supplies a transfer frequency to CCD 1. FIG. 5 shows the waveform of each section. The video input signal generated by CCD 1 is added to both the first adder 3 and the differentiating circuit 2 to obtain primary differentiated signals. When this differentiation signal n and the input video signal m are added by the first adder 3, a combined waveform o is obtained and the contour or border line correction in the left hand portion is completed. Next, the differential signal n is inverted in phase by the inverter 4 to obtain an inverted differentiated waveform p. If the inverted differentiated waveform p is added to the combined waveform o, the same signal as the original input video signal m is obtained. However, if the video signal o is delayed by passing it through the delay circuit 5 to obtain the delayed signal q and then addition is made by the second adder 6, the border line correction in the right hand portion can be made. Accordingly the output r of the second adder 6 has been corrected in the contours in the right and left portions. The duration of the contour correction is determined by the time constant T of the differentiating circuit 2. Assume that the highest frequency component (the transfer frequency obtained from clock generator 8 in this example) contained in the input video signal in m is $f_{max}$. Favorable results were obtained when the time constant T of the differentiating circuit was selected to satisfy the inequalities: $1/(5f_{max}) \geq T \geq 1/(10f_{max})$. Moreover, favorable results were obtained by selecting the delay time $\tau$ of the delay circuit 5 to substantially equal T. No interruption is caused practically if the delay time $\tau$ is within the range $\frac{1}{2}T \leq \tau \leq 2T$.

FIG. 6 shows the example in which the positive-going and negative-going edges of an input video signal m are steep. In this case also the symmetrical property of th video waveform r' after contour correction is not lost. Although contour correction is more emphatic in the video waveform r' shown in FIG. 6 than the video waveform r of FIG. 5, the contour correction is never more excessive than the one shown in FIG. 6 even when the positive-going and negative-going edges of the input video signal m' become steeper than those shown.

In other words, since the indicial response of the differential circuit is $Ee^{t/T}$, where E is the peak value of an input video signal, the amplitude does not exceed the value of E. Accordingly contour correction with excellent symmetry is produced.

Figure 7:
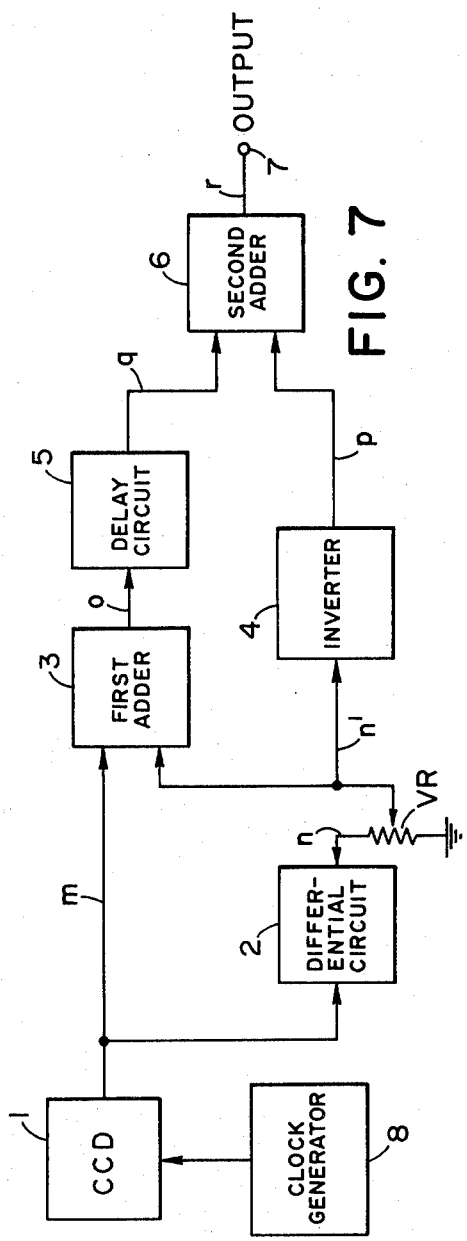
FIG. 7 is a block diagram showing another embodiment of the invention.

The amplitude of the contour correcting signal added by the first and second adders may be varied by varying the adding ratio of the adders. As shown in FIG. 7, it is possible to obtain contour correction signals of any desired amplitude by attenuating the amplitude of the differentiated waveform through by resistance-dividing the output signal n of differential circuit 2 with a variable resistor VR.

Figure 8:
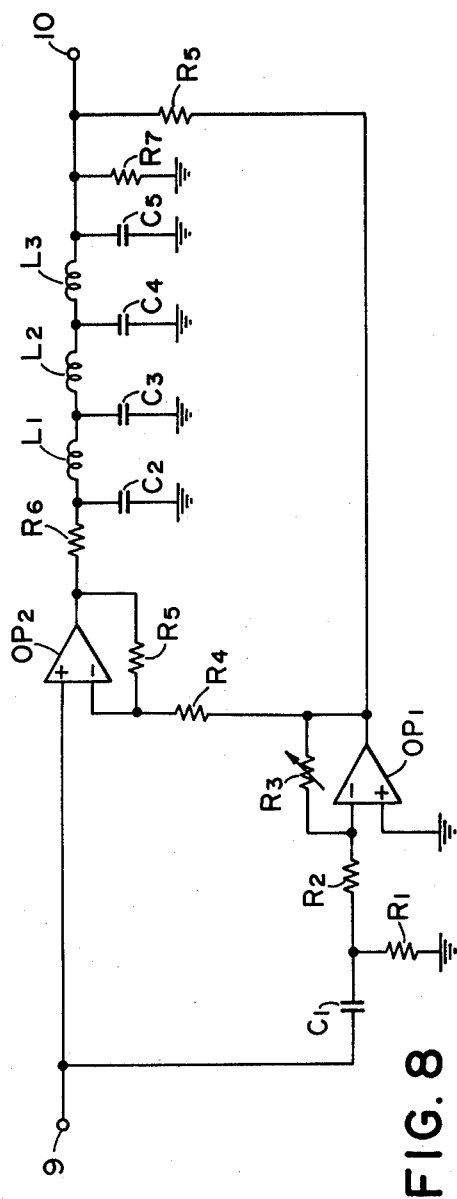
FIG. 8 shows an embodiment of a specific circuit configuration according to this invention.

Further, although in the example shown in FIGS. 4 and 7, an inverter is provided between the differentiating circuit 2 and second adder 6, it may be provided between the delay circuit 5 and second adder 6 when required, and, the second adder 6 may be a subtracter in which case the inverter 4 is unnecessary. Furthermore, other deformed circuits can be used so far as they do not depart from the basic technique of waveform processing. Moreover, although the video signal is obtained from CCD 1, the video signals obtained from other means such as a BBD (bucket brigade device) and other solid state image pickup devices, or an image pickup tube can of course be utilized. FIG. 8 shows an example of a specifically applied circuit of this invention. In FIG. 8, numeral 9 denotes an input terminal for video signals, 10 an output terminal, R a resistor, C a capacitor, L an inductor and OP an operational amplifier. To simplify the circuit, the first adder is made a subtractor which obtains the differentiated signals after the inverter. The resistance synthesizing method is employed in the second adder.

A description of the circuit follows. The video signal input to the input terminal 9 is primary differentiated by the differentiating circuit comprising the capacitor C1 and resistor R1. The time constant T of the differentiating circuit is expressed by T=C1.R1. The thus obtained differentiated signal is inverted by the inverter which consists of the operational amplifier OP1, resistor R2, and variable resistor R3. The inverted differentiated signal is subtracted from the video signal by the subtractor comprising the operational amplifier OP2 and resistors R4 and R5. This results in the addition of the differentiated signal the video signal. Further, the added signal is delayed by the delay circuit comprising inductors L1 through L3 and capacitors C2 through C5. By adding the delayed signal to the inverted differentiated signal by resistors R7 and R8, a video signal corrected in contour is obtained. When resistor R2 is equal to variable resistor R3 in resistance, the differentiated waveform may be used as a correction signal unchanged, and the amplitude of the correction signal may be varied by varying the ratio of the resistance values.

As has been described so far, since in this invention correction of contour is produced solely by primary differentiated waveforms, no distortion is produced in the correction signal as shown in FIG. 3. Moreover, since the amplitude of the correction signal is varied and controlled, the excessive correction, where the rising and falling edges of the video signal are steep, is prevented as shown in FIG. 2. As has been described so far, since this invention is provided with a differentiating means to differentiate an input video signal, a delay means to delay the differentiated waveform obtained from the differentiating means and a synthesizing means such as an adder which synthesizes the inverted waveform of said differentiated waveform, delayed video signal, and delayed differentiated waveform, a contour correcting arrangement for video signals is provided for performing a contour or border line correction having a satisfactory symmetrical property even when the video signal changes steeply. This invention is not limited to the above-described example but many modifications and variations may be effected without departing from the spirit and scope of the present invention, as set forth in the following claims.

What I claim is:

1. A contour correcting apparatus for video signals, comprising:
    differentiating means for differentiating an input video signal to produce a differentiated waveform;
    delay means for delaying said differentiated waveform and said video signal for a predetermined time period to produce a delayed differentiated waveform and delayed video signal;
    inverting means for phase inverting said differentiated waveform to produce a phase inverted differentiated waveform; and
    combining means for combining said phase inverted differentiated waveform, said delayed differentiated waveform and said delayed video signal.

2. The apparatus of claim 1 wherein said differentiating means is constructed and arranged to effect a time constant T which satisfies the relationship $$1/(5 f_{max}) \geq T \geq 1/(10 f_{max})$$

with respect to the highest frequency component $f_{max}$ of said video signal.

3. The apparatus of claim 2, wherein said delay means comprises means for delaying said differentiated waveform by a predetermined time period $\tau$ which satisfies the relationship $$\tfrac{1}{2}T \geq \tau \geq 2T$$

with respect to said time constant T.

4. The apparatus of claim 1, further comprising attenuating means for attenuating the amplitude of said differentiated waveform.

5. The apparatus of claim 4, wherein said attenuating means comprises a variable resistor.

6. A contour correcting apparatus for video signals, comprising:
    a differentiating circuit for performing primary differentiation of an input video signal;
    an adder for adding an output of said differentiating circuit to said video signal;
    a delay circuit for delaying an output of said adder by a predetermined time period; and
    a combining circuit for combining said output of said differentiating circuit and said output of said delay circuit.

7. The apparatus of claim 6 wherein said video signal comprises a signal produced by a solid state pickup device.

8. The apparatus of claim 7, further comprising an attenuator circuit for attenuating an output of said differentiating circuit.

9. The apparatus of claim 6, wherein said differentiating circuit comprises a capacitor and a resistor.

10. The apparatus of claim 9, wherein said differentiating circuit is constructed and arranged to effect a time constant T which satisfies the relationship $$1/(5 f_{max}) \geq T \geq 1/(10 f_{max})$$

with respect to the maximum frequency component $f_{max}$ of said video signal.

11. The apparatus of claim 9, wherein said delay circuit comprises means for delaying said adder output by a time period $\tau$ which satisfies the relationship $$\tfrac{1}{2}T \leq \tau \leq 2T$$

with respect to the time constant T of said differentiating circuit.

12. The apparatus of claim 7, wherein said differentiating circuit is constructed and arranged to effect a time constant T which satisfies the relationship $$1/(5f_t) \geq T \geq 1/(10f_t)$$

with respect to a transfer frequency $f_t$ of said solid-state pickup device.

13. A contour correcting apparatus for video signals, comprising:
video signal generating means for generating a video signal;
differentiating means for effecting primary differentiation of said video signal to produce a primary differentiated waveform; and
combining means for combining said video signal and said primary differentiated waveform so that a changing portion of said video signal is emphasized.

14. The video signal contour correcting apparatus of claim 13, wherein said combining means comprises adder means for adding said video signal and said primary differentiated waveform to produce the new signal with an added waveform.

15. The video signal contour correcting apparatus of claim 14, wherein said adder means includes amplitude varying means for varying the amplitude of said primary differentiated waveform thereby modifying the ratio of said video signal to said primary differentiated signal in the added waveform of the new signal.

16. A contour correcting apparatus for video signals, comprising:
video signal generating means for generating a video signal;
signal forming means for forming a plurality of change signals which differ from each other in phase and with each change signal being responsive to a change of said video signal;
amplitude varying means for producing a plurality of amplitude-modified change signals corresponding to said plurality of change signals, with each amplitude-modified change signal differing in amplitude from a corresponding change signal; and
combining means for combining said video signal and said amplitude-modified change signals in such a way that said amplitude-modified change signals do not cancel each other.

17. The video signal contour correcting apparatus of claim 16, wherein said signal forming means comprises duration varying means for varying the duration of said change signal.

18. The video signal contour correcting apparatus of claim 17, wherein said duration varying means comprises differentiating means for differentiating said video signal to produce a differentiated waveform.

19. A contour correcting apparatus for video signals, comprising:

video signal generating means for generating a video signal;
signal forming means for forming a change signal indicating the degree of change of said video signal and having duration varying means for varying the duration of said change signal, said duration varying means including differentiating means for differentiating said video signal to produce a differentiated waveform wherein said differentiating means comprises a differentiating circuit constructed and arranged to effect a time constant T which satisfies the following relationship with respect to the maximum frequency component $f_{max}$ of said video signal:

$$1/(5 \times f_{max}) \geq T \geq 1/(10 \times f_{max})$$

amplitude varying means for producing an amplitude-modified change signal which differs in amplitude from said change signal; and
combining means for combining said amplitude-modified change signal and said video signal.

20. The video signal contour correcting apparatus of claim 18, wherein said amplitude varying means comprises attenuating means for attenuating the amplitude of said differentiated waveform.

21. A contour correcting apparatus for video signals, comprising:
video signal generating means for generating a video signal;
signal forming means for forming a change signal indicating the degree of change of said video signal;
amplitude varying means for producing an amplitude-modified change signal which differs in amplitude from said change signal;
combining means for combining said amplitude-modified change signal and said video signal to produce a combined signal; and
delay means for producing a signal delayed by a determined time period from said combined signal.

22. A contour correcting apparatus for video signals, comprising:
video signal generating means for generating a video signal;
signal forming means for forming a change signal indicating the degree of change of said video signal;
amplitude varying means for producing an amplitude-modified change signal which differs in amplitude from said change signal;
combining means for combining said amplitude-modified change signal and said video signal to produce a combined signal;
delay means for producing a signal delayed by a determined time period from said combined signal; and
additional combining means for combining said amplitude-modified change signal and said delayed signal.

23. A contour correcting apparatus for video signals, comprising:
video signal generating means for generating a video signal;
differentiating means for differentiating said video signal to produce a differentiated waveform;

combining means for combining said differentiated waveform and said video signal to produce a combined signal;

forming means for forming a differentiated waveform which is phase inverted in comparison to said differentiated waveform produced by said differentiating means; and control means for controlling said combined signal in such a manner that, when said combined signal and said phase-inverted differentiated waveform are combined, said phase-inverted differentiated waveform and a differentiated waveform component in said combined signal do not act to cancel one another.

24. The video signal contour correcting apparatus of claim 23, wherein said control means comprises delay means for delaying said combined signal.

25. The video signal contour correcting apparatus of claim 24, wherein said differentiating means is constructed and arranged to effect a time constant T which satisfies the following relation with respect to the maximum frequency component $f_{max}$ of said video signal:

$$1/(5 \times f_{max}) \geq T \geq 1/(10 \times f_{max}).$$

26. The video signal contour correcting apparatus of claim 24 or 25, wherein said delay means comprises means for delaying said combined signal by a delay time $\tau$ which satisfies the following relation with respect to a time constant T of said differentiating means:

$$T/2 \leq \tau \leq 2T.$$

27. A contour correcting apparatus for video signals, comprising:

video signal generating means for generating a video signal;

signal forming means for forming a change signal indicating the degree of change in said video signal;

delay means for delaying said video signal by a determined time period; and combining means for combining said change signal and said delayed video signal so that a changing portion of said video signal is emphasized.

28. The video signal contour correcting apparatus of claim 27, wherein said signal forming means comprises differentiating means for differentiating said video signal to produce the new signal with a differentiated waveform.

29. A contour correcting apparatus for video signals, comprising:

video signal generating means for generating a video signal;

signal forming means for forming a change signal indicating the degree of change in said video signal, wherein said signal forming means includes differentiating means for differentiating said video signal to produce a differentiated waveform;

delay means for delaying said video signal by a determined time period; and combining means for combining said change signal and said delayed video signal, wherein said combining means includes inverting means for inverting the phase of said differentiated waveform.

30. A contour correcting apparatus for video signals, comprising:

video signal generating means for generating a video signal;

correction signal forming means for generating a first correction signal for correcting one time-wise portion of said video signal and a second correction signal for correcting another time-wise portion of said video signal; and correcting means for combining said video signal and said first correction signal in a delayed state with said second correction signal.

31. The video signal contour correcting apparatus of claim 30, wherein said correction signal forming means comprises change signal forming means for forming said first correction signal and said second correction signal in response to the degree of change of said video signal.

32. The video signal contour correcting apparatus of claim 31, wherein said change signal forming means includes inverting means for inverting said first correction signal to form said second correction signal.

33. The video signal contour correcting apparatus of claim 31, wherein said change signal forming means includes differentiating means for differentiating said video signal.

34. The video signal contour correcting apparatus of claim 30, wherein said correcting means includes means for producing a signal combined and delayed from said video signal and said first correction signal.

35. The video signal contour correcting apparatus of claim 34, wherein said correcting means further comprises combining means for combining said combined and delayed signal and said second correction signal.

* * * * *